May 20, 1952 L. D. HINDALL 2,597,796

ELECTRONIC CATHODE GATE

Filed Feb. 4, 1949

INVENTOR.
LAWRENCE D. HINDALL

BY Herbert E. Metcalf
Attorney

Patented May 20, 1952 2,597,796

UNITED STATES PATENT OFFICE 2,597,796

ELECTRONIC CATHODE GATE

Lawrence D. Hindall, Inglewood, Calif., assignor to Northrop Aircraft, Inc., Hawthorne, Calif., a corporation of California Application February 4, 1949, Serial No. 74,553

3 Claims. (Cl. 250—27)

This invention relates to electronic gates, and more particularly to an electronic gate suitable for use with electronic counters and computers.

In electronic computers it is common to pass pulses to a counter through electronic gates which, when a gate is open (non-conductive), do not reach the counter, but which, when a gate is closed (conductive) permit the pulses to enter the counter. The present invention concerns a gate having a simple circuit, fast in action and one which can discriminate between positive and negative pulses. It is an object of the invention to provide a simple and fast acting gate suitable for use in electronic counters and the like.

Figure 1:
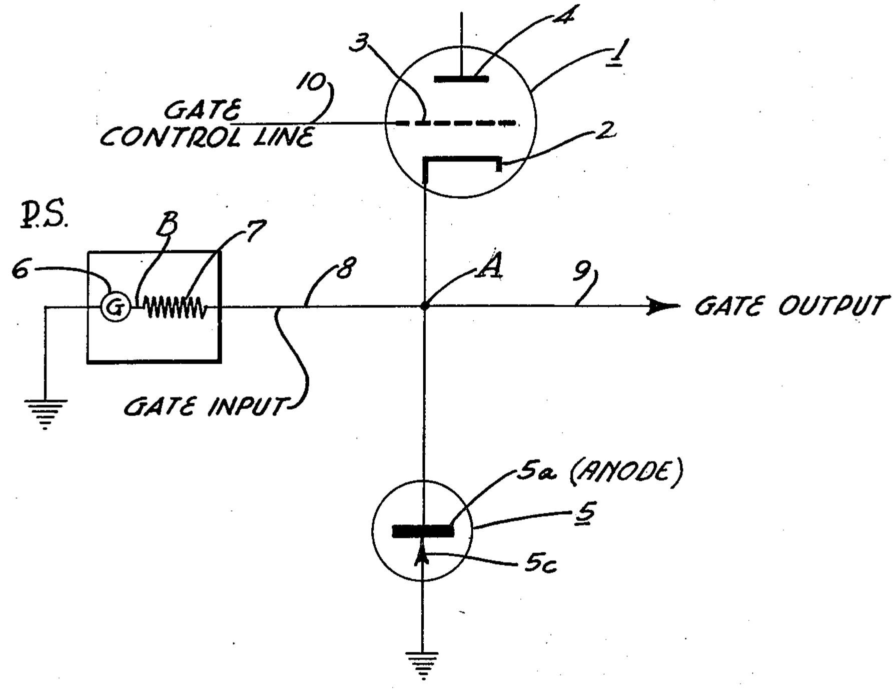
Figure 1 is a circuit diagram of one preferred form of the present invention.
Figure 2:
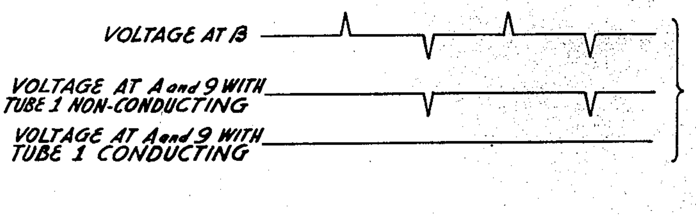
Figure 2 is a graph of voltages at various points in the circuit of Figure 1, as pulses are applied to the input of the gate.

Referring first to Figure 1, a vacuum tube 1 comprising at least three electrodes, a cathode 2, a control grid 3 and an anode 4 is connected to ground through a diode 5. In this case the anode 5*a* of the diode is connected to cathode 2 of the vacuum tube.

A high impedance pulse source P. S. incorporating, for example, a generator 6 and a resistance 7 has its output connected to the cathode 2 of vacuum tube 1 and anode 5*a* of the diode 5 at point A through gate input line 8. Point A is connected to a gate output line 9. Pulse source P. S. may produce both positive and negative pulses. The connection of generator 6 to resistance 7 is labelled point B. A connection 10 is made to grid 3 of tube 1 for use as a gate control line.

In operation, the condition of the gate, i. e., open or closed, will depend on the conducting or non-conducting condition of tube 1. For example, assume that tube 1 is non-conducting. When in that condition, the anode 5*a* of diode 5 will be at substantially the same voltage as the voltage of its cathode 5*c*. When a positive pulse arrives at point A in the circuit, this pulse will cause the anode 5*a* of the diode 5 to become sufficiently positive so that the diode will pass current, thereby shorting or dissipating the positive pulse. The circuit from point A through the diode 5 to ground offers a very low impedance to positive pulses. However, when a negative pulse arrives at point A from pulse source P. S., this pulse will appear in the gate output line 9 because the diode offers a high impedance to ground with a negative potential on anode 5*a*.

When tube 1 is conducting, a different condition exists. With tube 1 conducting, a positive pulse is applied to point A from pulse source P. S. Again, the low impedance to ground through diode 5 will effectively pass the pulse to ground. When a negative pulse appears at point A the diode also presents a low impedance to ground as long as any positive current is flowing through it. Thus, any negative pulse at point B of an amplitude equal to or less than that required to draw a negative current through resistance 7, equal to, or less than, the positive current through the diode 5 supplied by the conducting tube 1, is effectively shorted to ground by the diode and does not appear in gate output line 9.

Thus, positive pulses are never passed, and the passage of negative pulses depends on the conducting or non-conducting condition of tube 1. The speed with which the gate opens or closes is dependent only on the speed with which tube 1 can be turned on or off, and the controlling current does not affect the voltage output in the gate output line 9.

Furthermore, the introduction of the diode 5 into the cathode line of tube 1 does not appreciably affect the operation of tube 1, so that in many cases the gate diode can be added to an already existing circuit, so that no additional tube 1 is needed. The gate is also efficient since all the current flowing through the controlling circuit, namely, vacuum tube 1, is used to control the gate.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A gating circuit comprising a diode having the cathode thereof grounded, a grid controlled vacuum tube having the cathode thereof connected to the anode of said diode to pass or not pass current through said diode, means for generating pulses connected to the anode of said diode, and a pulse output connection to said anode.

2. A gating circuit comprising a diode having the cathode thereof grounded, a grid controlled vacuum tube, the cathode of said vacuum tube connected to the anode of said diode for energizing said diode to pass or not pass current through said diode, means for generating pulses of both polarities connected to the anode of said diode, and a pulse output connection to said anode, whereby when said vacuum tube is conducting, both positive and negative pulses from said generating pulse means are effectively shorted through said diode; and when said vacuum tube is non-conducting, positive pulses from said generating pulse means are effectively shorted through said diode and negative pulses therefrom are passed to said pulse output connection.

3. Apparatus in accordance with claim 2 wherein said means for generating pulses is connected to said anode through a resistance, wherein the negative current drawn through said resistance by a negative voltage pulse must be equal to or less than the positive current through said diode supplied by said conducting vacuum tube to effectively short said negative pulse to ground by said diode.

LAWRENCE D. HINDALL.

REFERENCES CITED

The following references are of record in the file of this patent:

UNITED STATES PATENTS

| Number | Name | Date |
|---|---|---|
| 2,432,227 | Dailey et al. | Dec. 9, 1947 |
| 2,440,049 | Houghton | Apr. 20, 1948 |

OTHER REFERENCES

Electronics, July 1947, "Clipping and Clamping Circuits" by Mather, pages 111–113.